United States Patent
Horita et al.

(10) Patent No.: US 12,184,984 B2
(45) Date of Patent: Dec. 31, 2024

(54) IMAGE CAPTURING APPARATUS

(71) Applicant: Panasonic Intellectual Property Management Co., Ltd., Osaka (JP)

(72) Inventors: Asuka Horita, Kanagawa Ken (JP); Tomio Shimizu, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 126 days.

(21) Appl. No.: 18/105,006

(22) Filed: Feb. 2, 2023

(65) Prior Publication Data

US 2023/0188859 A1 Jun. 15, 2023

Related U.S. Application Data

(63) Continuation of application No. PCT/JP2021/028185, filed on Jul. 29, 2021.

(30) Foreign Application Priority Data

Aug. 5, 2020 (JP) ................. 2020-133420

(51) Int. Cl.
*H04N 23/71* (2023.01)
*H04N 23/11* (2023.01)
(Continued)

(52) U.S. Cl.
CPC .............. *H04N 23/71* (2023.01); *H04N 23/11* (2023.01); *H04N 23/76* (2023.01); *H04N 23/88* (2023.01)

(58) Field of Classification Search
CPC ........ H04N 23/11; H04N 23/12; H04N 23/71; H04N 23/76; H04N 23/84; H04N 23/88; H04N 23/95; H04N 25/131
(Continued)

(56) References Cited

U.S. PATENT DOCUMENTS

2010/0283866 A1 11/2010 Numata
2017/0134704 A1 5/2017 Otsubo et al.
(Continued)

FOREIGN PATENT DOCUMENTS

JP 2004312553 A * 11/2004 ............... H04N 9/04
JP 2008-289001 11/2008
(Continued)

OTHER PUBLICATIONS

International Search Report (ISR) from International Searching Authority (Japan Patent Office) in International Pat. Appl. No. PCT/JP2021/028185, dated Oct. 12, 2021, together with an English language translation.

*Primary Examiner* — Behrooz M Senfi
(74) *Attorney, Agent, or Firm* — Greenblum and Bernstein, P.L.C.

(57) ABSTRACT

An image capturing apparatus including the following elements is disclosed. An optical bandpass filter causes visible light and near-infrared light to selectively pass through. An image capturing element outputs a first signal indicating light intensity of the visible light and the near-infrared light and a second signal indicating light intensity of the near-infrared light. A subtractor outputs a third signal by subtracting the second signal from the first signal. A multiplier outputs a fourth signal at a signal level not more than the signal level of the second signal by multiplying the second signal by a control value. An adder outputs an image signal by adding the fourth signal to the third signal. A luminance matrix circuit outputs luminance information on the visible region of the image signal. A luminance level determination circuit supplies the multiplier with the control value corresponding to a luminance level of the visible region.

6 Claims, 5 Drawing Sheets

(51) Int. Cl.
*H04N 23/76* (2023.01)
*H04N 23/88* (2023.01)

(58) Field of Classification Search
USPC .......................................... 348/164
See application file for complete search history.

(56) References Cited

U.S. PATENT DOCUMENTS

| | | |
|---|---|---|
| 2017/0150071 A1 | 5/2017 | Otsubo et al. |
| 2018/0020200 A1* | 1/2018 | Hagiwara ................ H04N 9/64 |
| 2018/0270462 A1 | 9/2018 | Otsubo et al. |
| 2020/0154088 A1 | 5/2020 | Otsubo et al. |
| 2020/0236315 A1* | 7/2020 | Kimura .............. G01B 11/2513 |
| 2021/0297638 A1* | 9/2021 | Sugiyama .............. G02B 5/201 |

FOREIGN PATENT DOCUMENTS

| | | | |
|---|---|---|---|
| JP | 2011-228855 | 11/2011 | |
| JP | 2017-118284 | 6/2017 | |
| JP | 2018-093284 | 6/2018 | |
| JP | 2019-004514 | 1/2019 | |
| JP | 2019-205018 | 11/2019 | |
| JP | 2021174009 A * | 11/2021 | ............. G02B 1/002 |

* cited by examiner

| PIXEL | PIXEL OUTPUT |
|-------|--------------|
| B     | B'=B+IR      |
| G     | G'=G+IR      |
| R     | R'=R+IR      |
| BL    | BL=IR        |

IMAGE CAPTURING APPARATUS

CROSS-REFERENCE TO RELATED APPLICATIONS

This application is a continuation of International Application No. PCT/JP2021/028185, filed on Jul. 29, 2021, which claims the benefit of priority of the prior Japanese Patent Application No. 2020-133420, filed on Aug. 5, 2020, the entire contents of which are incorporated herein by reference.

FIELD

The present disclosure relates to an image capturing apparatus.

BACKGROUND

There is a conventionally known technology related to an image capturing apparatus that is able to acquire an image even in an environment where quantity of visible light is small, such as at nighttime (for example, JP 2008-289001 A). The acquisition of such an image is enabled by installing, in the image capturing apparatus, an image capturing element capable of detecting not only visible light having a wavelength of a visible region but also near-infrared light having a wavelength of a near-infrared region.

SUMMARY

An image capturing apparatus according to the present disclosure includes an optical bandpass filter, an image capturing element, a subtractor, a multiplier, an adder, a luminance matrix circuit, and a luminance level determination circuit. The optical bandpass filter is configured to cause visible light and near-infrared light to selectively pass through the optical bandpass filter. The visible light has a wavelength of a visible region. The near-infrared light has a wavelength of a near-infrared region. The image capturing element is configured to output a first signal and a second signal. The first signal has a signal level corresponding to received light intensity of the visible light and the near-infrared light each passing through the optical bandpass filter. The second signal has a signal level corresponding to received light intensity of the near-infrared light passing through the optical bandpass filter. The subtractor is configured to output a third signal by subtracting the second signal from the first signal. The multiplier is configured to output a fourth signal at a signal level less than or equal to the signal level of the second signal by multiplying the second signal by a control value. The adder is configured to output an image signal by adding the fourth signal to the third signal. The luminance matrix circuit is configured to output luminance information on the visible region corresponding to the image signal. The luminance level determination circuit is configured to supply, on the basis of the luminance information from the luminance matrix circuit, the multiplier with the control value being a value corresponding to a luminance level of the visible region.

DETAILED DESCRIPTION

Embodiments of an image capturing apparatus according to the present disclosure will be described below with reference to the drawings.

Conventionally, as eyesight assistance for giving an additional field of view to the driver, a vehicle is equipped with a back camera at a rear portion and with a side camera beside a side mirror. In this relation, for improving vehicular safety, there is a known technology to detect a person or an object by utilizing a picture taken by a camera, and then give a warning to the driver or control the vehicle, on the basis of a result of the detection.

As vehicular control with a picture taken by a camera, for example, an automatic parking function has been known, which is implemented on the basis of a picture including the entire periphery of a vehicle captured by a camera. However, for example, the capturing region of a side camera is often involved in a dark environment situation, such as a situation where light from the vehicle does not reach the capturing region of the side camera. Therefore, a visible camera capable of detecting visible light having the wavelength of a visible region has difficulty in capturing a picture at an adequate sensitivity.

In contrast to the above, there is a known technology to acquire an image by using a camera with two wavelength bands, even in an environment where quantity of visible light is small, such as at nighttime. Such a camera includes an image capturing element capable of detecting not only visible light but also near-infrared light having the wavelength of a near-infrared region.

However, in an environment where quantity of visible light is large, such as at daytime, deterioration is likely to occur in image quality, such as a deterioration in the color reproducibility of an image to a subject due to near-infrared light detected in addition to visible light. Moreover, for inhibition of deterioration in image quality, when control is performed to switch use of near-infrared light between an environment where quantity of light is large and an environment where quantity of light is small, occurrence of a difference in image quality at the time of switching in control is likely to give a user a sense of discomfort.

Considering the above, it is desirable to optimize image quality with inhibition of a deterioration in the color reproducibility of a subject due to near-infrared light.

The image capturing apparatus according to the present disclosure is, for example, each of in-vehicle cameras installed in a vehicle. The in-vehicle cameras include, for example, four cameras attached to a front portion, a rear portion, a left side portion, and a right side portion of the vehicle.

The front portion of the vehicle is, for example, an emblem portion of the vehicle. The front in-vehicle camera is attached in such a posture as to, for example, look obliquely down the road surface ahead of the vehicle. That is, the front in-vehicle camera is provided so as to capture a predetermined capturing region where an area ahead of the vehicle is centered.

The rear portion of the vehicle is, for example, the rear license garnish portion of the vehicle. The rear in-vehicle camera is attached in such a posture as to, for example, look obliquely down the road surface behind the vehicle. That is, the rear in-vehicle camera is provided so as to capture a predetermined capturing region where an area behind the vehicle is centered.

The left side portion and the right side portion of the vehicle, namely, the lateral portions of the vehicle are, for example, the side mirror portions of the vehicle. The lateral in-vehicle cameras are each attached in such a posture as to, for example, look down the road surface lateral to the vehicle. That is, the lateral in-vehicle cameras are each provided so as to capture a predetermined capturing region where an area of the lateral side of the vehicle is centered.

Note that, for example, adjacent ones of the in-vehicle cameras are disposed such that the respective capturing regions partially overlap. In this case, images acquired by the in-vehicle cameras are combined to join one another, so that an image indicating the entire periphery of the vehicle can be generated.

Note that examples of a vehicle to be equipped with the image capturing apparatus according to the present disclosure include a bicycle, a motorcycle, an automobile, and a train, and various types of vehicles can be appropriately used. The image capturing apparatus according to the present disclosure may be installed in not only a vehicle but also various types of movable objects, such as a ship and an aircraft.

Various types of movable objects including vehicles may be manned or unmanned. Such movable objects may be each controlled to move by a user or may be each controlled autonomously.

Figure 1:
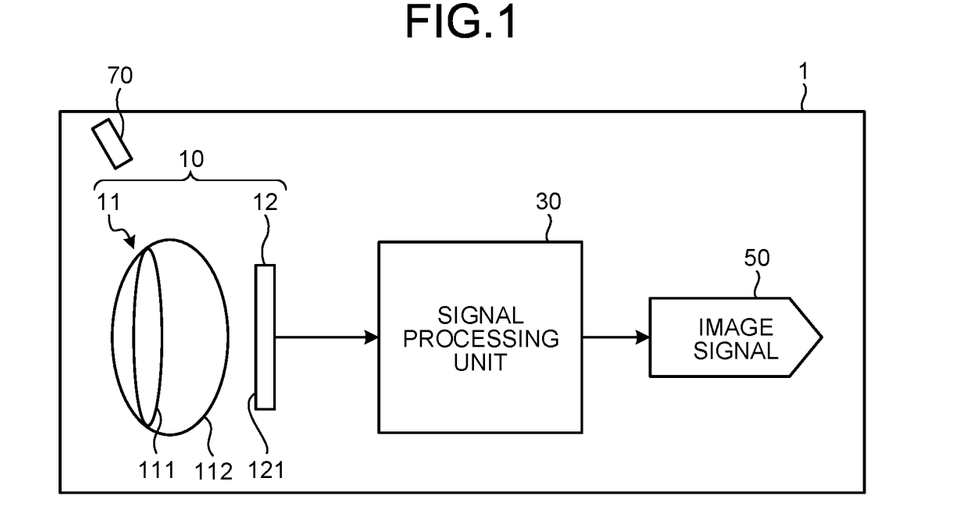
FIG. 1 is a diagram illustrating an exemplary configuration of an image capturing apparatus according to an embodiment.
Figure 2:
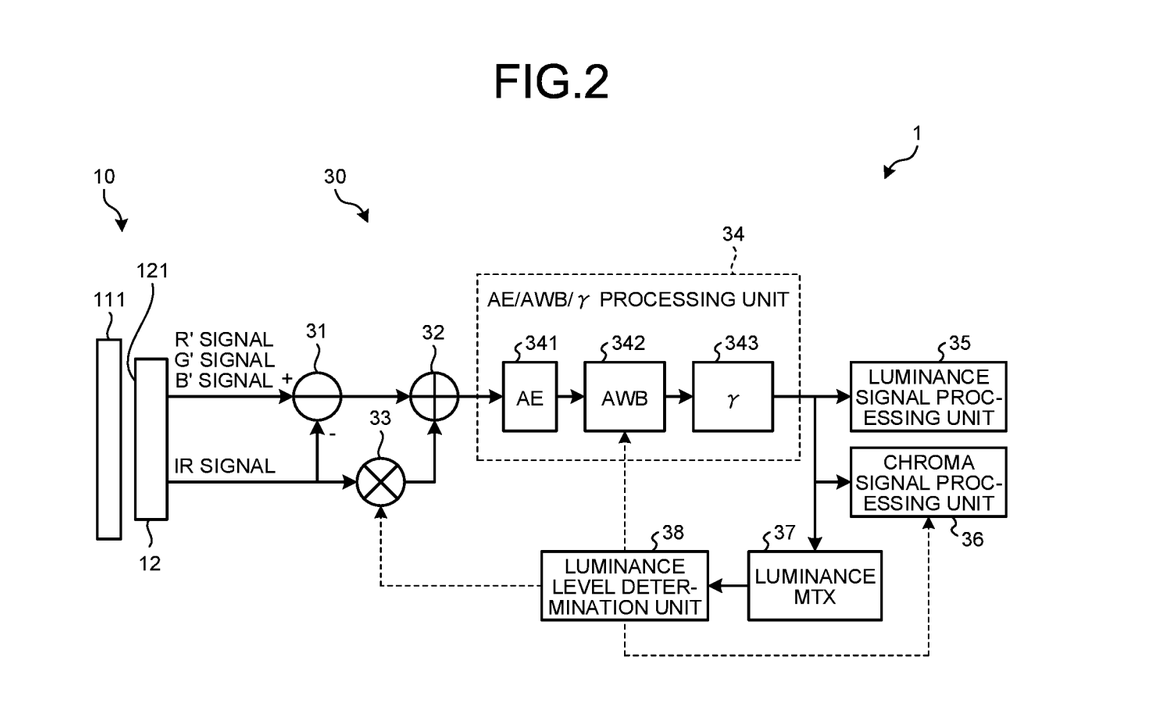
FIG. 2 is a diagram illustrating an exemplary configuration of a signal processing unit in FIG. 1.

FIG. 1 is a diagram illustrating an exemplary configuration of an image capturing apparatus 1 according to an embodiment. FIG. 2 is a diagram illustrating an exemplary configuration of a signal processing unit 30 in FIG. 1.

As illustrated in FIG. 1 and FIG. 2, the image capturing apparatus 1 includes an image capturing unit 10 and the signal processing unit 30. The image capturing unit 10 sequentially captures a predetermined capturing region at a predetermined frame rate and outputs a read pixel signal to the signal processing unit 30. The pixel signal includes an RGB signal and an IR signal. The RGB signal and the IR signal will be described in detail below. The signal processing unit 30 is configured to perform signal processing of seamless subtraction or addition between the RGB signal and the IR signal on the basis of matrix information on the RGB signal given by the image capturing unit 10. The image capturing apparatus 1 outputs an image signal 50 on which the signal processing has been performed by the signal processing unit 30.

As illustrated in FIG. 1, the image capturing unit 10 includes an image capturing optical system 11 and an image capturing element 12. The image capturing unit 10 outputs, to the signal processing unit 30, a pixel signal at a signal level corresponding to the received light intensity of a luminous flux of a subject, which is formed on the image capturing face of the image capturing element 12 through the image capturing optical system 11.

As illustrated in FIG. 1, the image capturing optical system 11 includes an optical bandpass filter (BPF) 111 and a lens 112.

Figure 3:
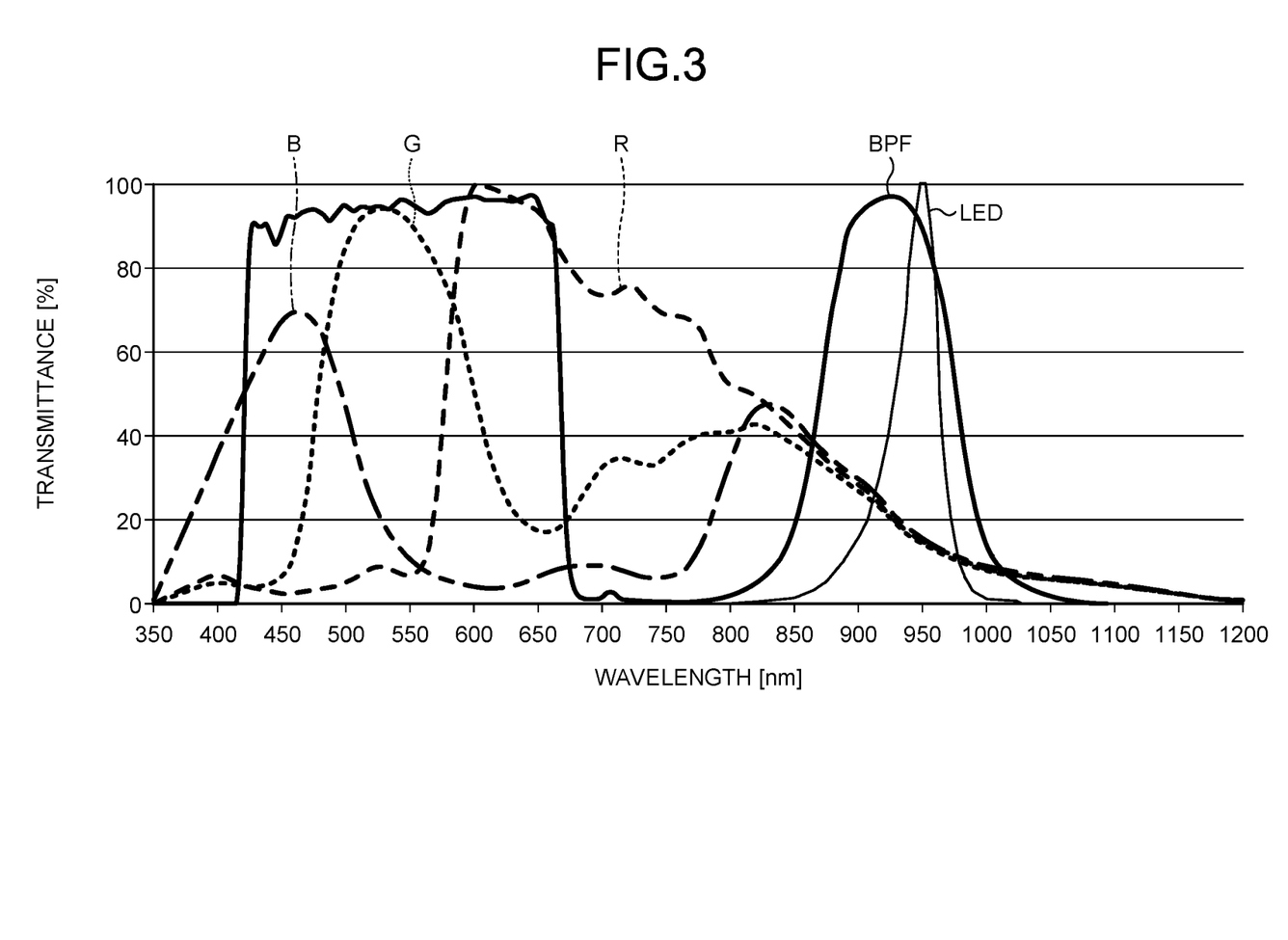
FIG. 3 is a diagram illustrating an exemplary transmittance property of an optical bandpass filter in FIG. 1 and FIG. 2.

The optical BPF 111 is a filter that has wavelength selectivity enabling selective transmission of light having a particular wavelength. FIG. 3 is a diagram illustrating an exemplary transmittance property (BPF) of the optical BPF 111 in FIG. 1 and FIG. 2. In a graph illustrated in FIG. 3, the vertical axis and the horizontal axis represent transmittance [%] and wavelength [nm], respectively. Note that, in the graph illustrated in FIG. 3, in addition to the transmittance property (BPF) of the optical BPF 111, the spectral properties (R, G, B) regarding visible light of the image capturing element 12 and the emission spectrum (LED) of a light emitting diode (LED) emitting near-infrared light are indicated. As illustrated in FIG. 3, the optical BPF 111 is configured to cause visible light as light having the wavelength of a visible region and near-infrared light having the wavelength of a near-infrared region to selectively pass through.

The lens 112 is an optical element that forms a luminous flux of a subject on the image capturing face of the image capturing element 12. Note that, in FIG. 1, the lens 112 is exemplified as a single lens, but is not limited to this. While the lens 112 is required to have a desired image-formation performance by at least one optical element having a power, the lens 112 may be a compound lens including at least one single lens or may include a lens component and a reflective component in combination.

The image capturing element 12 is configured to output a pixel signal at a signal level corresponding to the received light intensity of a luminous flux of a subject, which is formed on the image capturing face through the image capturing optical system 11. As the image capturing element 12, for example, a solid-state image capturing element such as a charge coupled device (CCD), or a complementary metal-oxide semiconductor (CMOS), can be appropriately used. The image capturing element 12 is disposed at the position at which the lens 112 forms a luminous flux of a subject. The image capturing element 12 is constituted by light receiving units that are two-dimensionally arranged to form pixels. For example, the light receiving units are each a photodiode. The light receiving units is each capable of detecting visible light having the wavelength of a visible region and near-infrared light having the wavelength of a near-infrared region. The light receiving units each generates electric charges corresponding to the optical intensity of received light, namely, the amount of received light. The generated electric charges are accumulated in a capacitor connected to the corresponding light receiving unit. The electric charge accumulated in the capacitor is read as a pixel signal.

A color filter 121 is provided on the subject side of the image capturing face of the image capturing element 12. The color filter 121 has a pixel arrangement in which the R pixels are replaced with BL (black) pixels and part of the B pixels is replaced with R pixels in a Bayer arrangement structure. The Bayer arrangement structure refers to a color filter arrangement structure that lines of R and G pixels being alternately arranged in the horizontal direction and lines of B and G pixels being alternately arranged in the horizontal direction are alternately disposed in the vertical direction.

Figure 4:
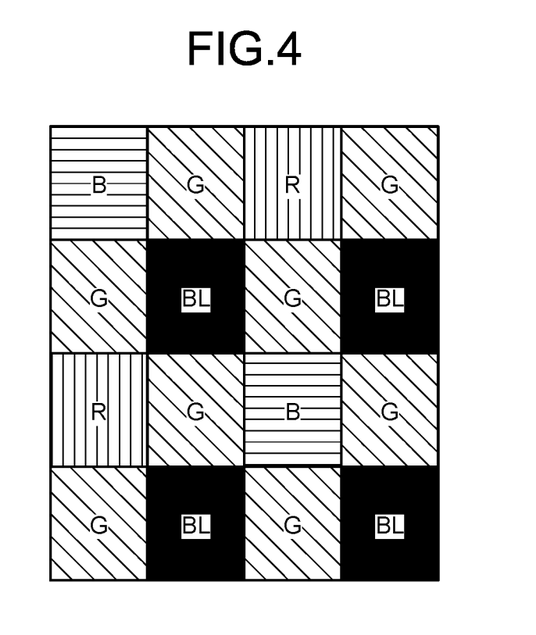
FIG. 4 is a schematic view of an exemplary arrangement pattern in a color filter of an image capturing element in FIG. 1 and FIG. 2.

FIG. 4 is a schematic view of an exemplary arrangement pattern in the color filter 121 of the image capturing element 12 in FIG. 1 and FIG. 2. Specifically, as illustrated in FIG. 4, the color filter 121 according to the embodiment has an arrangement structure that lines of four pixels of a B pixel, a G pixel, an R pixel, and a G pixel in this order are repeatedly arranged in the horizontal direction and lines of G and BL pixels being alternately arranged in the horizontal direction are alternately disposed in the vertical direction.

Note that a difference in the horizontal direction by two pixels is present between vertically adjacent two lines out of the lines in which four pixels of a B pixel, a G pixel, an R pixel, and a G pixel in this order are repeatedly arranged in the horizontal direction. In other words, the arrangement structure of the color filter 121 according to the embodiment includes a pixel group in which a B pixel, a G pixel, a BL pixel, and a G pixel in this order are arranged clockwise and a pixel group in which an R pixel, a G pixel, a BL pixel, and a G pixel in this order are arranged clockwise.

Note that the arrangement pattern in the color filter 121 is not limited to the arrangement structure illustrated in FIG. 4. For example, the arrangement structure of the color filter 121 may be a pixel arrangement in which part of the G pixels is replaced with BL (block) pixels in a Bayer arrangement structure.

Figure 5:
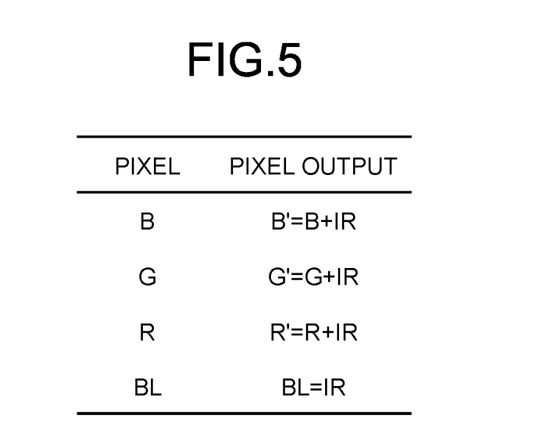
FIG. 5 is a diagram illustrating an exemplary relationship between each pixel in the image capturing element and an output signal from the image capturing element in FIG. 1 and FIG. 2.

A pixel signal output from each of the pixels of the image capturing element 12 will be described. FIG. 5 is a diagram illustrating an exemplary relationship between each pixel in the image capturing element 12 and an output signal from the image capturing element 12 in FIG. 1 and FIG. 2. Pixel signals from the image capturing element 12 includes an RGB signal and a BL signal. As illustrated in FIG. 2 and FIG. 5, the RGB signal includes an R' signal, a G' signal, and a B' signal.

The R' signal is a signal read from an R pixel. The G' signal is a signal read from a G pixel. The B' signal is a signal read from a B pixel. The BL signal is an IR signal read from a BL pixel. Note that the spectral property regarding near-infrared light of the image capturing element 12 corresponds to, for example, the emission spectrum (LED) of the LED that emits near-infrared light, illustrated in FIG. 3.

As described above, the optical BPF 111 is configured to cause near-infrared light to pass through. The light receiving units in the image capturing element 12 are each capable of detecting visible light and near-infrared light. In such a configuration, the respective filters in the color filter 121 corresponding to the R pixel, the G pixel, and the B pixel are capable of causing not only red light, green light, and blue light, respectively, but also near-infrared light to passing through. For example, in a case where the received light intensity of the visible light component of a luminous flux of a subject is smaller than the sensitivity of detection of the image capturing element 12, the R' signal, the G' signal, and the B' signal are each equivalent to the BL signal.

Therefore, as indicated in FIG. 5, the R' signal is a signal equivalent to the sum of an R signal at a signal level corresponding to the received light intensity of red light and an IR signal at a signal level corresponding to the received light intensity of near-infrared light. The G' signal is a signal equivalent to the sum of a G signal at a signal level corresponding to the received light intensity of green light and the IR signal. The B' signal is a signal equivalent to the sum of a B signal at a signal level corresponding to the received light intensity of blue light and the IR signal. Accordingly, it can be expressed that the image capturing element 12 outputs an RGB signal at a signal level corresponding to the received light intensity of visible light and near-infrared light through the optical BPF 111 and an IR signal at a signal level corresponding to the received light intensity of near-infrared light through the optical BPF 111. The RGB signal is an example of the first signal. The IR signal is an example of the second signal.

As illustrated in FIG. 2, the signal processing unit 30 includes a subtractor 31, an adder 32, a multiplier 33, an AE/AWB/γ processing unit 34, a luminance signal processing unit 35, a chromatic signal processing unit 36, a luminance matrix (MTX) 37, and a luminance level determination unit 38.

The subtractor 31, the adder 32, the multiplier 33, the luminance signal processing unit 35, the chromatic signal processing unit 36, the luminance MTX 37, and the luminance level determination unit 38 are each implemented by a logic circuit, such as a digital signal processor (DSP), an application specific integrated circuit (ASIC), or a field-programmable gate array (FPGA).

Note that at least two of the subtractor 31, the adder 32, the multiplier 33, the luminance signal processing unit 35, the chromatic signal processing unit 36, the luminance MTX 37, and the luminance level determination unit 38 may be implemented by a single logic circuit. The subtractor 31, the adder 32, the multiplier 33, the luminance signal processing unit 35, the chromatic signal processing unit 36, the luminance MTX 37, and the luminance level determination unit 38 may be each implemented by two or more logic circuits.

The subtractor 31 serves as a circuit block that subtracts a signal input to a minus input terminal from a signal input to a plus input terminal, and outputs a signal indicating the difference between the two input signals. This signal indicating the difference is an example of the third signal. The two input terminals of the subtractor 31 are electrically connected to output terminals of the image capturing element 12. An output terminal of the subtractor 31 is electrically connected to one of two input terminals of the adder 32, which is different from the other input terminal to which the multiplier 33 is connected.

The adder 32 serves as a circuit block that adds two signals input to two input terminals and outputs an image signal indicating the sum of the two input signals. The two input terminals of the adder 32 are electrically connected, respectively, to the output terminal of the subtractor 31 and the output terminal of the multiplier 33. An output terminal of the adder 32 is electrically connected to an input terminal of the AE/AWB/γ processing unit 34.

The multiplier 33 serves as a circuit block that multiplies a signal input to an input terminal by a signal indicating a multiplication value which is input to a control terminal, and outputs a signal indicating the product of the signal input to the input terminal and the signal indicating the multiplication value. Note that the signal level of the signal indicating the product is less than or equal to the signal level of the signal input to the input terminal. That is, the multiplication value is a real number from 0 to 1 inclusive. The multiplication value is an example of the control value. The signal indicating the product is an example of the fourth signal. The input terminal of the multiplier 33 is electrically connected to the output terminal of the image capturing element 12 in parallel with the minus input terminal of the subtractor 31. The control terminal of the multiplier 33 is electrically connected to one of output terminals of the luminance level determination unit 38. The output terminal of the multiplier 33 is electrically connected to one of the two input terminals of the adder 32, which is different from the other input terminal to which the subtractor 31 is connected.

The input terminal of the AE/AWB/γ processing unit 34 is electrically connected to the output terminal of the adder 32. A control terminal of the AE/AWB/γ processing unit 34 is electrically connected to one of the output terminals of the luminance level determination unit 38. An output terminal of the AE/AWB/γ processing unit 34 is electrically connected to the respective input terminals of the luminance signal processing unit 35, the chromatic signal processing unit 36, and the luminance MTX 37. The AE/AWB/γ processing unit 34 includes a hardware processor, such as a central processing unit (CPU), and a memory such as a flash memory. When the processor executes a program loaded in the memory, the AE/AWB/γ processing unit 34 functions as an AE processing unit 341, an AWB processing unit 342, and a γ processing unit 343. The AE/AWB/γ processing unit 34 is an example of a processing unit.

Note that the AE/AWB/γ processing unit 34 may be implemented by a logic circuit, such as a DSP, an ASIC, or an FPGA. In this case, at least two of the subtractor 31, the adder 32, the multiplier 33, the AE/AWB/γ processing unit 34, the luminance signal processing unit 35, the chromatic signal processing unit 36, the luminance MTX 37, and the luminance level determination unit 38 may be implemented by a single logic circuit. The AE/AWB/γ processing unit 34 may be implemented by two or more logic circuits.

The AE processing unit 341 performs automatic exposure (AE) control processing. Specifically, on the basis of an AE evaluation value indicating the luminance of a subject in image data, the AE processing unit 341 sets capturing conditions corresponding to aperture value corrections, such as a gain for the image capturing element 12 and a shutter speed value. In other words, the AE processing unit 341 optimizes the brightness of the image shown by the image signal 50.

In accordance with a control signal from the luminance level determination unit 38, the AWB processing unit 342 performs automatic white balance (AWB) control processing. In the AWB control processing, the AWB processing unit 342 adjusts the signal level of the RGB signal output from the image capturing element 12, in accordance with the color temperature of a luminous flux of the subject. For example, on the basis of the average value or integrated value of the pixel values of pixels identical in color for each predetermined pixel group of the image capturing element 12, the AWB processing unit 342 adjusts the signal level of the RGB signal such that the respective signal levels of the R signal and the B signal are identical to the signal level of the G signal. Note that, the AWB processing unit 342 calculates the average value or integrated values of the pixel values of pixels identical in color, on the basis of the signal passing through the spectrum transmittance property of the image capturing optical system 11 and the spectrum sensitivity property of the image capturing element 12.

The γ processing unit 343 performs gamma conversion processing. In the gamma conversion processing, the γ processing unit 343 adjusts a gamma value to adjust the contrast of the image shown by the image signal 50, and thereby improves the visibility of the image.

The luminance signal processing unit 35 serves as a circuit block that performs luminance signal processing. The luminance signal processing unit 35 includes, for example, a luminance MTX circuit configured to output luminance information from the RGB signal and a circuit configured to perform contour correction processing for making the image distinct. An input terminal of the luminance signal processing unit 35 is electrically connected to the output terminal of the AE/AWB/γ processing unit 34.

The chromatic signal processing unit 36 serves as a circuit block that performs color signal processing. The chromatic signal processing unit 36 includes, for example, a color signal MTX circuit, a circuit that performs chromaticity correction processing, and a circuit that performs chromatic gain adjustment processing. An input terminal of the chromatic signal processing unit 36 is electrically connected to the output terminal of the AE/AWB/γ processing unit 34 in parallel with the input terminal of the luminance signal processing unit 35. The chromatic signal processing unit 36 has a control terminal electrically connected to one of the output terminals of the luminance level determination unit 38.

An output terminal of the luminance signal processing unit 35 and an output terminal of the chromatic signal processing unit 36 are electrically connected to an output terminal of the signal processing unit 30 via a coupler not illustrated. That is, the image signal 50 output from the output terminal of the signal processing unit 30 is a signal obtained by combining an output signal from the luminance signal processing unit 35 and an output signal from the chromatic signal processing unit 36.

The luminance MTX 37 serves as a circuit block that outputs luminance information on the visible region in accordance with the RGB signal. An input terminal of the luminance MTX 37 is electrically connected to the output terminal of the AE/AWB/γ processing unit 34 in parallel with the input terminal of the luminance signal processing unit 35 and the input terminal of the chromatic signal processing unit 36. An output terminal of the luminance MTX 37 is electrically connected to an input terminal of the luminance level determination unit 38.

As an example, the luminance MTX circuit of the luminance signal processing unit 35 and the luminance MTX 37 each output luminance information by calculating a luminance signal (Y) for each of the pixels of the image capturing element 12 in accordance with a luminance MTX expression compliant with the SD (BT601) standard. The luminance MTX expression compliant with the SD (BT601) standard is given as Expression (1). In Expression (1), R, G, and B represent the signal level of the R signal, the signal level of the G signal, and the signal level of the B signal, respectively.

$$Y=0.3R+0.59G+0.11B$$

As another example, the luminance MTX circuit of the luminance signal processing unit 35 and the luminance MTX 37 each output luminance information by calculating a luminance signal (Y) in accordance with a luminance MTX expression compliant with the HD (BT709) standard. The luminance MTX expression compliant with the HD (BT709) standard is given as Expression (2). In Expression (2), R, G, and B represent the signal level of the R signal, the signal level of the G signal, and the signal level of the B signal, respectively.

$$Y=0.21R+0.72G+0.07B$$

Note that the luminance MTX circuit of the luminance signal processing unit 35 and the luminance MTX 37 may be integrated as one body. For example, the luminance signal processing unit 35 serves as a circuit block that includes the luminance MTX 37 and performs luminance signal processing on the image signal on the basis of the luminance information from the luminance MTX 37. This configuration enables a reduction in the number of components of circuitry or a reduction in the size of circuitry. A reduction in the number of components of circuitry and a reduction in the size of circuitry contribute a reduction in the cost of the image capturing apparatus 1 and a reduction in the size of the image capturing apparatus 1.

The luminance level determination unit 38 serves as a circuit block that controls the operation of the signal processing unit 30 on the basis of the luminance information. Specifically, the luminance level determination unit 38 controls the operation of the signal processing unit 30 in accordance with the signal level of the luminance signal, namely, the luminance level of the visible region, for each pixel included in the luminance information. An input terminal of the luminance level determination unit 38 is electrically connected to the output terminal of the luminance MTX 37. The luminance level determination unit 38 has three output terminals electrically connected, respectively, to the control terminal of the multiplier 33, the control terminal of the AE/AWB/γ processing unit 34, and the control terminal of the chromatic signal processing unit 36.

The luminance level determination unit 38 is configured to determine the luminance level of the visible region on the basis of the luminance signal of each of the pixels, which is output by the luminance MTX 37. As an example, the luminance level determination unit 38 determines a luminance level for each predetermined region on the image capturing face of the image capturing element 12. The predetermined region is, for example, a region of 8 pixels consisting of 2×4 pixels or 4×2 pixels, a region of 16 pixels consisting of 4×4 pixels, or a region of any combination thereof, in the arrangement illustrated in FIG. 4. Moreover, the predetermined region may be a region in which the number of pixels between a central portion and a peripheral portion in the image capturing face is difference.

As another example, the luminance level determination unit 38 determines a luminance level regarding a particular region on the image capturing face of the image capturing element 12. The particular region is, for example, a region of pixels in a central portion or a peripheral portion in the image capturing face. The particular region is optional in size and is, for example, a region of 8 pixels consisting of 2×4 pixels or 4×2 pixels, a region of 16 pixels consisting of 4×4 pixels, or a region of any combination thereof, in the arrangement illustrated in FIG. 4. Two or more particular regions may be provided in the central portion or the peripheral portion. The particular region may be provided in both the central portion and the peripheral portion.

As still another example, the luminance level determination unit 38 determines a luminance level regarding the entire region of the image capturing face of the image capturing element 12.

Figure 6:
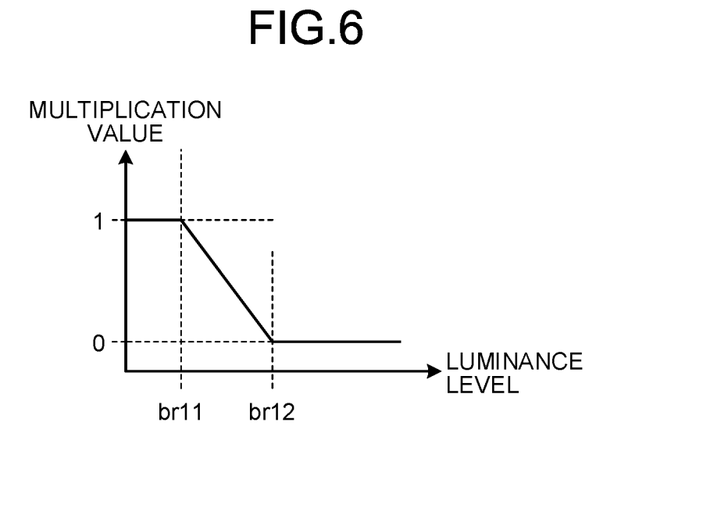
FIG. 6 is a diagram illustrating an exemplary property of multiplier control corresponding to a luminance level according to the embodiment.

The luminance level determination unit 38 is configured to control the signal level of the IR signal to be added to the RGB signal, in accordance with the luminance level. FIG. 6 is a diagram illustrating an exemplary property of multiplier control corresponding to the luminance level according to the embodiment.

In a case where the luminance level is larger than a predetermined threshold br12, the luminance level determination unit 38 supplies the control terminal of the multiplier 33 with "0" as the multiplication value. In a "bright environment" where the luminance level of the visible region is high, the signal level of the output signal from the multiplier 33 becomes "0", so that the adder 32 adds nothing to the output signal from the subtractor 31. Then, the R signal, the G signal, and the B signal are supplied to the AE/AWB/γ processing unit 34.

In a case where the luminance level is less than or equal to a predetermined threshold br11, the luminance level determination unit 38 supplies the control terminal of the multiplier 33 with "1" as the multiplication value. In an "extremely dark environment" where the luminance level of the visible region is extremely low, the multiplier 33 outputs the IR signal without any changes, so that the adder 32 adds the IR signal subtracted by the subtractor 31. Then, the R' signal, the G' signal, and the B' signal are supplied to the AE/AWB/γ processing unit 34.

Meanwhile, in a case where the luminance level is larger than the predetermined threshold br11 and is less than or equal to the predetermined threshold br12, the luminance level determination unit 38 supplies the control terminal of the multiplier 33 with a value corresponding to the luminance level and is in the range from "0" to "1", as the multiplication value. That is, in the "dark environment" where the luminance level of the visible region is low, the more the luminance level of the visible region becomes low, the more the signal level of the output signal from the multiplier 33 becomes high, and thereby the degree of addition of the IR signal by the adder 32 to the output signal from the subtractor 31 increases. The region where the luminance level is larger than the predetermined threshold br11 and is less than or equal to the predetermined threshold br12 is an example of a first range. The predetermined threshold br11 is an example of a lower limit of the first range. The predetermined threshold br12 is an example of an upper limit of the first range.

Note that, in the example illustrated in FIG. 6, in the region where the luminance level is larger than the predetermined threshold br11 and is less than or equal to the predetermined threshold br12, the relationship between the multiplication value and the luminance level is linear but may be nonlinear.

As described above, on the basis of the luminance information from the luminance MTX 37, the luminance level determination unit 38 supplies the multiplier 33 with the multiplication value being a value corresponding to the luminance level of the visible region. Thus, the signal processing unit 30 implements continuous addition between the IR signal and each of the R signal, the G signal, and the B signal. The image capturing apparatus 1 is able to inhibit the user from having a sense of discomfort due to a discontinuous switch between control of adding the IR signal and control of adding no IR signal.

Note that, in a case where the luminance level is the predetermined threshold br11, the multiplication value corresponding to the luminance level may be supplied to the control terminal of the multiplier 33. In a case where the luminance level is the predetermined threshold br12, "0" as the multiplication value may be supplied to the control terminal of the multiplier 33.

Figure 7:
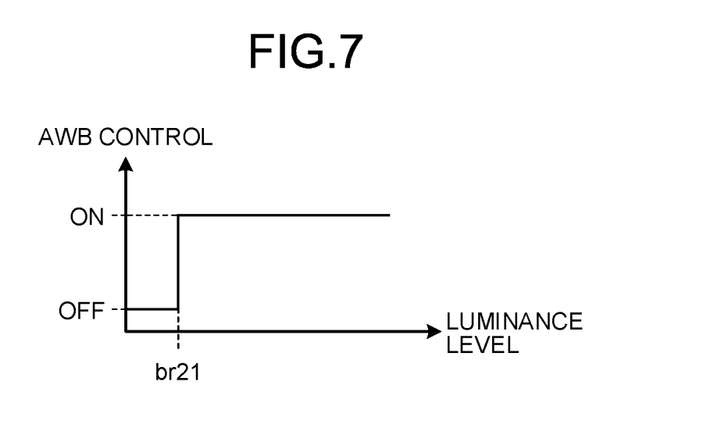
FIG. 7 is a diagram illustrating an exemplary property of white balance control corresponding to the luminance level according to the embodiment.

The luminance level determination unit 38 is configured to switch white balance control between ON and OFF in accordance with the luminance level. FIG. 7 is a diagram illustrating an exemplary property of white balance control corresponding to the luminance level according to the embodiment.

In a case where the luminance level is larger than a predetermined threshold br21, the luminance level determination unit 38 supplies the control terminal of the AE/AWB/γ processing unit 34 with a control signal for switching white balance control to be in an ON state. On the other hand, in a case where the luminance level is less than or equal to the predetermined threshold br21, the luminance level determination unit 38 supplies the control terminal of the AE/AWB/γ processing unit 34 with a control signal for switching the white balance control to be in an OFF state. The predetermined threshold br21 is an example of a first threshold.

As described above, in a state of low illumination where the luminance level of the visible region is low, namely, in the "extremely dark environment", the luminance level determination unit 38 causes the white balance control to stop. Therefore, the image capturing apparatus 1 is able to inhibit any negative effect due to white balance control to a region having less chromatic information.

Note that a control signal for switching white balance control to be in an ON state may be supplied to the control terminal of the AE/AWB/γ processing unit 34 in a case where the luminance level is the predetermined threshold br21.

Figure 8:
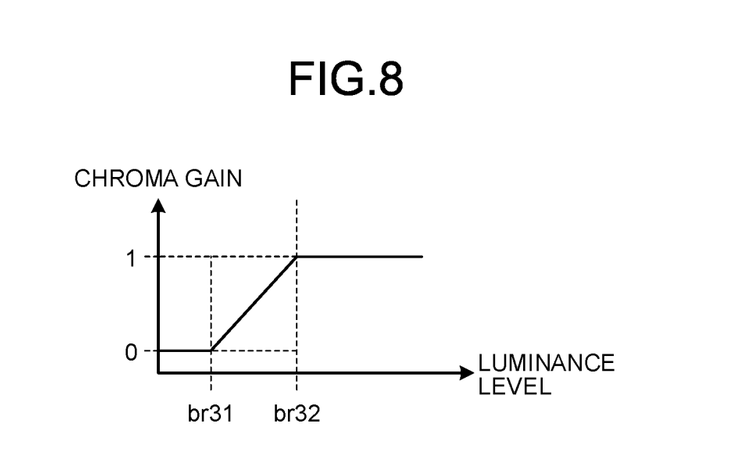
FIG. 8 is a diagram illustrating an exemplary property of chromatic gain control corresponding to the luminance level according to the embodiment.

The luminance level determination unit 38 is configured to control the gain of chromatic signal processing in accordance with the luminance level. FIG. 8 is a diagram illustrating an exemplary property of chromatic gain control corresponding to the luminance level according to the embodiment.

In a case where the luminance level is larger than a predetermined threshold br32, namely, in the "bright environment" where the luminance level of the visible region is high, the luminance level determination unit 38 supplies the control terminal of the chromatic signal processing unit 36 with "1" as the value of chromatic gain. In a case where the luminance level is less than or equal to a predetermined threshold br31, namely, in the "extremely dark environment" where the luminance level of the visible region is extremely low, the luminance level determination unit 38 supplies the control terminal of the chromatic signal processing unit 36 with "0" as the value of chromatic gain. Meanwhile, in a case where the luminance level is larger than the predetermined threshold br31 and is less than or equal to the predetermined threshold br32, namely, in the "dark environment" where the luminance level of the visible region is low, the luminance level determination unit 38 supplies the control terminal of the chromatic signal processing unit 36 with a value as the value of chromatic gain, which corresponds to the luminance level and is in the range of from "0" to "1". In this case, the more the luminance level of the visible region becomes low, the more the value of chromatic gain lowers. The region where the luminance level is larger than the predetermined threshold br31 and is less than or equal to the predetermined threshold br32 is an example of a second range.

Note that, in the example illustrated in FIG. 8, in the region where the luminance level is larger than the predetermined threshold br31 and is less than or equal to the predetermined threshold br32, the relationship between the value of chromatic gain and the luminance level is linear but may be nonlinear.

As described above, in a state of low illumination where the luminance level is low, the signal processing unit 30 suppresses the signal level of a chromatic signal. That is, it becomes a monochrome state. Therefore, the image capturing apparatus 1 is able to inhibit deterioration in image quality under low illumination with reduction of chromatic noise under low illumination.

Note that the value of chromatic gain corresponding to the luminance level may be supplied to the control terminal of the chromatic signal processing unit 36 in a case where the luminance level is the predetermined threshold br31. In a case where the luminance level is the predetermined threshold br32, "1" as the value of chromatic gain may be supplied to the control terminal of the chromatic signal processing unit 36.

Note that the predetermined threshold br11, the predetermined threshold br21, and the predetermined threshold br31 may be identical or different in luminance level. Similarly, the predetermined threshold br12 and the predetermined threshold br32 may be identical or different in luminance level.

An exemplary operation of the image capturing apparatus 1 according to the embodiment will be described. The following flow is sequentially performed on a pixel signal acquired by sequential image capturing at a predetermined frame rate.

The image capturing element 12 generates a R' signal, a G' signal, and a B' signal each corresponding to the received light intensity of visible light and near-infrared light through the optical BPF 111, and then supplies the generated R' signal, G' signal, and B' signal to the plus input terminal of the subtractor 31. The image capturing element 12 generates an IR signal corresponding to the received light intensity of near-infrared light through the optical BPF 111, and then supplies the generated IR signal to each of the minus input terminal of the subtractor 31 and the input terminal of the multiplier 33.

The subtractor 31 subtracts the IR signal from the R' signal, the G' signal, and the B' signal, and then outputs an R signal, a G signal, and a B signal to the adder 32. The multiplier 33 multiplies the IR signal by a multiplication value coming from the luminance level determination unit 38, and outputs, to the adder 32, a signal at a signal level less than or equal to the signal level of the input IR signal. After that, the adder 32 adds the signals output from the subtractor 31 and the signal output from the multiplier 33 together and then outputs, to the AE/AWB/γ processing unit 34, an image signal acquired by the addition.

The AE/AWB/γ processing unit 34 performs AE control processing on the basis of the image signal output from the adder 32. Moreover, image processing, such as AWB control processing or gamma conversion processing, is performed on the image signal output from the adder 32. Note that the determination as to whether or not to perform AWB control processing is made on the basis of a control signal from the luminance level determination unit 38. The AE/AWB/γ processing unit 34 supplies the image signal, on which image processing has been performed, to the luminance signal processing unit 35, the chromatic signal processing unit 36, and the luminance MTX 37.

After that, the luminance signal processing unit 35 performs luminance signal processing on the image signal from the AE/AWB/γ processing unit 34. the chromatic signal processing unit 36 performs chromatic signal processing on the image signal from the AE/AWB/γ processing unit 34, by using chromatic gain from the luminance level determination unit 38. The image signal having been processed by the luminance signal processing unit 35 and the image signal having been processed by the chromatic signal processing unit 36 are combined and then output as the image signal 50 for the current frame.

The luminance MTX 37 outputs luminance information on the visible region corresponding to the image signal from the AE/AWB/γ processing unit 34. The luminance level determination unit 38 determines the luminance level of the visible region on the basis of the luminance information from the luminance MTX 37. The luminance level determination unit 38 supplies the multiplier 33 with a multiplication value corresponding to the determined luminance level, and thereby achieves properties of multiplier control corresponding to the luminance level.

Figure 9:
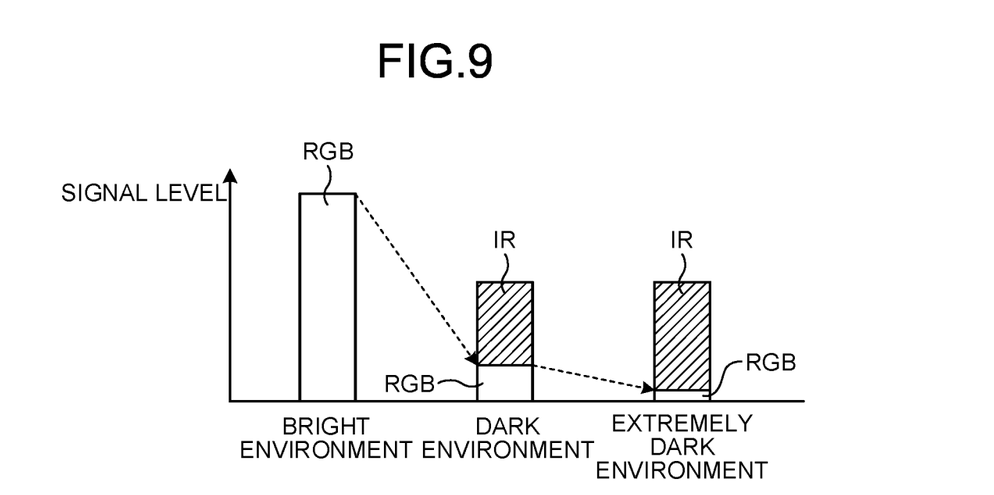
FIG. 9 is a diagram for explaining an image signal acquired by multiplier control corresponding to the luminance level according to the embodiment.

FIG. 9 is a diagram for explaining the image signal 50 acquired by multiplier control corresponding to the luminance level according to the embodiment.

In the "bright environment" where the luminance level of the visible region is high, the multiplication value to be supplied from the luminance level determination unit 38 to the multiplier 33 is "0". As illustrated in FIG. 9, the image signal 50 is generated by only using the R signal, the G signal, and the B signal each corresponding to the received light intensity of visible light.

In the "dark environment" where the luminance level of the visible region is low, the multiplication value to be supplied from the luminance level determination unit 38 to the multiplier 33 is a value corresponding to the luminance level. That is, as illustrated in FIG. 9, the image signal 50 is generated by addition of the IR signal at a signal level corresponding to the luminance level to the R signal, the G signal, and the B signal corresponding to the received light intensity of visible light.

In the "extremely dark environment" where the luminance level of the visible region is extremely low, the multiplication value to be supplied from the luminance level determination unit 38 to the multiplier 33 is "1". That is, as illustrated in FIG. 9, the image signal 50 is generated by addition of the IR signal corresponding to the received light intensity of near-infrared light to the R signal, the G signal, and the B signal corresponding to the received light intensity of visible light.

The luminance level determination unit 38 supplies the AE/AWB/γ processing unit 34 with a control signal corresponding to the determined luminance level, and thereby achieves properties of white balance control corresponding to the luminance level. The luminance level determination unit 38 supplies the chromatic signal processing unit 36 with chromatic gain corresponding to the determined luminance level, and thereby achieves properties of chromatic gain control corresponding to the luminance level.

As described above, the image capturing apparatus 1 is configured to sequentially capture a predetermined capturing region at a predetermined frame rate and then output the image signal 50. The image capturing apparatus 1 is configured to perform seamless subtraction processing or seamless addition processing on the RGB signal and the IR signal, on the basis of matrix information on the RGB signal.

Therefore, the image capturing apparatus 1 according to the embodiment is able to optimize image quality with inhibition of deterioration in the color reproducibility of a subject due to near-infrared light. Additionally, the image capturing apparatus 1 according to the embodiment is able to perform seamless superimposition of the IR signal on the RGB signal, so that a sense of discomfort can be reduced to the user with inhibition of a change in image quality due to subtraction or addition between the RGB signal and the IR signal.

Note that, as illustrated in FIG. 1, the image capturing apparatus 1 according to the present disclosure may further include an illumination unit 70 that emits near-infrared light. The illumination unit 70 serves as an LED capable of emitting near-infrared light with the emission spectrum (LED) illustrated in FIG. 3, for example. This configuration enables a further improvement in the quality of an image acquired in an environment where quantity of visible light is small, such as at nighttime. The technology according to the embodiment enables inhibition of a change in image quality due to switching of the illumination unit 70 between ON and OFF.

Note that the image capturing apparatus 1 according to the present disclosure can be optionally applied not only to an in-vehicle camera but also to a camera for use in an environment where quantity of ambient light changes, such as a monitoring camera.

Note that part of or all the processing to be performed in the image capturing apparatus 1 according to the present embodiment may be implemented by software.

A program to be executed in the image capturing apparatus 1 according to the present embodiment is recorded, in an installable file format or an executable file format, on a computer-readable recording medium, such as a CD-ROM, a flexible disk (FD), a CD-R, or a digital versatile disk (DVD), for provision.

The program to be executed in the image capturing apparatus 1 according to the present embodiment may be stored in a computer connected to a network, such as the Internet, and may be downloaded for provision through the network. The program to be executed in the image capturing apparatus 1 according to the present embodiment may be provided or distributed through a network, such as the Internet.

The program to be executed in the image capturing apparatus 1 according to the present embodiment may be pre-installed on a ROM or the like, for provision.

At least one of the embodiments described above is capable of achieving optimization in image quality with inhibition of a deterioration in the color reproducibility of a subject due to near-infrared light.

The embodiments of the present invention described above are just exemplary and thus are not intended to limit the scope of the invention. The embodiments can be carried out in various modes, and thus various omissions, replacements, and modifications can be made without departing from the gist of the invention. The embodiments and modifications thereof are to be included in the scope and gist of the invention and are to be included in the scope of the invention in the claims and equivalents thereof.

What is claimed is:
1. An image capturing apparatus, comprising:
an optical bandpass filter that causes visible light and near-infrared light to selectively pass through the optical bandpass filter, the visible light having a first wavelength of a visible region, the near-infrared light having a second wavelength of a near-infrared region;
an image capturing element that outputs a first signal and a second signal, the first signal having a first signal level corresponding to a first received light intensity of the visible light and the near-infrared light each passing through the optical bandpass filter, the second signal having a second signal level corresponding to a second received light intensity of the near-infrared light passing through the optical bandpass filter;
a subtractor that outputs a third signal by subtracting the second signal from the first signal;
a multiplier that outputs a fourth signal at a third signal level less than or equal to the second signal level of the second signal by multiplying the second signal by a control value;
an adder that outputs an image signal by adding the fourth signal to the third signal;
a first circuit that outputs luminance information on the visible region corresponding to the image signal; and a second circuit that supplies, on a basis of the luminance information output from the first circuit, the multiplier with the control value corresponding to a luminance level of the visible region,
wherein the control value is a real number from 0 to 1, inclusive, and
the second circuit
reduces the control value as the luminance level increases in a first case where the luminance level is within a first range,
sets 0 as the control value in a second case where the luminance level is larger than an upper limit of the first range, and
sets 1 as the control value in a third case where the luminance level is smaller than a lower limit of the first range.

2. The image capturing apparatus according to claim 1, wherein the second circuit determines the luminance level on the basis of the luminance information.

3. The image capturing apparatus according to claim 1, further comprising:
a hardware processor connected to a memory, wherein the hardware processor performs white balance control to adjust a white balance of the image signal,
wherein, in a fourth case where the luminance level is less than or equal to a first threshold, the second circuit supplies the hardware processor with a control signal for switching the white balance control to be an OFF state.

4. The image capturing apparatus according to claim 1, further comprising:
a third circuit that performs chromatic signal processing on the image signal in accordance with a value of chromatic gain,
wherein, in a fourth case where the luminance level is within a second range, the second circuit increases the value of chromatic gain to be supplied to the chromatic signal processing performed by the third circuit as the luminance level increases.

5. The image capturing apparatus according to claim 1, further comprising a fourth circuit that performs luminance signal processing on the image signal on the basis of the luminance information output from the first circuit.

6. An image capturing apparatus, comprising:
an optical bandpass filter that causes visible light and near-infrared light to selectively pass through the optical bandpass filter, the visible light having a first wavelength of a visible region, the near-infrared light having a second wavelength of a near-infrared region;
an image capturing element that outputs a first signal and a second signal, the first signal having a first signal level corresponding to a first received light intensity of the visible light and the near-infrared light each passing through the optical bandpass filter, the second signal having a second signal level corresponding to a second received light intensity of the near-infrared light passing through the optical bandpass filter;
a subtractor that outputs a third signal by subtracting the second signal from the first signal;
a multiplier that outputs a fourth signal at a third signal level less than or equal to the second signal level of the second signal by multiplying the second signal by a control value;
an adder that outputs an image signal by adding the fourth signal to the third signal;
a first circuit that outputs luminance information on the visible region corresponding to the image signal;
a second circuit that supplies, on a basis of the luminance information output from the first circuit, the multiplier with the control value corresponding to a luminance level of the visible region; and
a third circuit that performs chromatic signal processing on the image signal in accordance with a value of chromatic gain,
wherein, in a case where the luminance level is within a second range, the second circuit increases the value of chromatic gain to be supplied to the chromatic signal processing performed by the third circuit as the luminance level increases.

* * * * *